Patented Jan. 16, 1951

2,538,479

UNITED STATES PATENT OFFICE 2,538,479

METHODS OF DEACIDIFYING SOLUTIONS

Eric G. Snyder, Philadelphia, and Joseph W. Opie, Drexel Hill, Pa., assignors to Wyeth Incorporated, Philadelphia, Pa., a corporation of Delaware No Drawing. Application March 13, 1946, Serial No. 654,210

7 Claims. (Cl. 260—96)

This invention relates to a method of deacidifying solutions of water-sensitive solutes in water-miscible organic solvents by contact of the solutions with solid acid-adsorbent or anion-exchange materials which have previously been partially but not completely dewatered. More particularly it relates to a method of deacidifying acid solutions of streptomycin or streptothricin in water-miscible organic solvents, for example acid eluates obtained in the isolation of these products, without introducing water into the solutions during de-acidification, by contacting the solutions with an acid-adsorbent or anion-exchange material which has previously been dewatered to such a degree that no water is given up to the solutions treated but not to such a degree that the acid adsorption or anion-exchange is inhibited; the dewatering of the adsorbent material is advantageously carried out by washing the wet material with a water-miscible solvent, for example the same solvent as occurs in the solutions to be treated, to remove free surface water but not to remove adsorbed water from the wet adsorbent material.

Streptomycin and streptothricin are among the most important bacteriostatic and bactericidal materials developed since the advent of penicillin. They are especially important because they are to a considerable extent complementary to the latter; for example they control or prevent the growth of pathogenic bacteria such as *Escherichia typhosa*, *Brucella abortus* and *suis*, the Salmonellas, the Mycobacteria, *Pseudomonas aeruginosa*, *Escherichia coli*, and *Klebsiella friedlaenderi*, which are relatively unaffected by penicillin. Streptomycin is also important because it has sufficiently low toxicity for higher animals to permit parenteral administration of effective therapeutic doses. Accordingly, economical and practical methods for the production of streptomycin and streptothricin are necessary factors in the adequate control of many infections.

Streptomycin and streptothricin, like penicillin, are products of the life processes of molds; they differ from penicillin, however, in that they are water-soluble bases and no way has been found to extract them from aqueous solution by the use of water-immiscible solvents. Consequently, their isolation follows a different course and offers different problems from those involved in penicillin production.

In the preparation of streptomycin and streptothricin, culture broths of the respective molds, *Actinomyces griseus* and *A. lavendulae* are usually clarified by filtration with a filter aid and then treated with activated carbon which adsorbs the desired active material. The active carbon is separated from the broth and is preferably freed of water by washing successively with acetone and methanol. The adsorbed active material is then recovered from the carbon by elution with a substantially water-free methanol solution of hydrochloric acid, preferably 0.1–0.2 normal.

It will thus be seen that in the preparation of both streptomycin and streptothricin it becomes necessary to neutralize a dilute acid methanol solution (0.1–0.2 normal HCl or $H_2SO_4$, or 2–5 percent $HCO_2H$). It is preferable to neutralize without addition of water, since the neutralized solution in the next step of the operation has to be concentrated to a very small volume before precipitation of the antibiotic by addition of acetone or ether. If even a small percentage of water is added with the neutralizing agent, the concentrate obtained (e. g., by vacuum distillation) contains a high percentage of water, the methanol having been selectively removed during the distillation and practically all the water remaining in the concentrate. On addition of acetone, streptomycin and streptothricin precipitate from such aqueous concentrates in a gummy form which causes great difficulties in the further purification steps. From concentrates free of water or low in water content, streptomycin and streptothricin precipitates obtained by addition of acetone are not gummy but fluffy masses of discrete particles which lend themselves readily to further treatment. Gummy precipitates can be dried only with difficulty and form hard lumps; the fluffy material obtained under the conditions of our invention dries rapidly to a fine powder suitable for further treatment or use.

Several apparently obvious methods of neutralizing the acid methanol eluate without the introduction of water have been found to involve even more serious difficulties. For example, the eluates may be neutralized by addition of a water-free alcoholic solution of NaOH or KOH or by addition of solid $CaCO_3$. With the latter agent it is possible to remove all the acid only with difficulty. Neutralization with alcoholic NaOH or KOH is impractical for other reasons. NaCl and KCl formed in this step precipitate, these salts being only slightly soluble in methanol. For the later purification steps, these inorganic salts have to be removed from the alcoholic streptomycin or streptothricin solution. As they (and likewise $CaCO_3$ which has to be used in excess for neutralization) have a tendency to adsorb streptomycin or streptothricin and as streptomycin tends to precipitate from partially neutralized solutions, especially when present as sulfate, removal of these inorganic salt precipitates is not possible without substantial loss of streptomycin or streptothricin and consequent reduction in yield.

Another method of obtaining substantially water-free neutralized methanol solutions when aqueous alkali hydroxide had been employed for neutralization is the treatment of the neutralized solution with drying agents like Drierite, anhydrous $MgSO_4$, anhydrous $Na_2SO_4$, and the like. The procedure again leads to streptomycin and streptothricin losses by adsorption or precipitation and is, accordingly, unsatisfactory and uneconomical.

It is well known that ions can be removed from solution by contact with many types of solid materials. In particular, the use of zeolites for softening water has long been used commercially, and in recent years so-called ion-exchange resins and other complex organic compounds have been introduced and found wide application. These materials are broadly divisible into two classes: cation exchangers and anion exchangers. The former have acid properties, due, for example, to hydroxyl groups in phenolformaldehyde resins, sulfonic groups in sulfonated coal, etc.; the latter have basic properties, due, for example, to amino groups in the molecule. An example of the latter is the synthetic resin sold as Amberlite IR-4 by the Resinous Products and Chemical Company of Philadelphia; other examples are De-Acidite (the Permutit Co., New York city) and Ionac-A (American Cyanamid and Chemical Corp., New York city).

Since it was known that anion-exchange materials would react with solutes in organic solvents, it occurred to us that it would be a relatively simple matter to treat the water-free acid methanol eluate containing streptomycin or streptothricin with dried ion-exchange material and thereby free the solution of acid without introducing water. The commercial material as received ordinarily is a granular mass of approximately 30-60 mesh particle size and contains approximately 50 percent water. We, accordingly, dried a sample by vacuum filtration, washing with methanol and air-drying, and tested its efficacy in neutralizing our methanol solutions. We found the deacidifying effect was either absent or so slow as to make the reaction impracticable. With water-containing methanol solutions, on the other hand, neutralization could be effectively carried out; but the presence of water in the solutions was highly undesirable for the reasons noted above.

We then discovered on further experimentation the surprising fact that the anion-exchange resin could, by a very simple procedure, be dewatered to a point at which the resin yields no substantial amount of water to the acid methanol solution and yet retains sufficient water to permit effective deacidification of the methanol solution.

According to one embodiment of our invention as applied to streptomycin and streptothricin recovery, we first partially dewater wet commercial anion-exchange resin by vacuum filtration or other equivalent means, then slurry the resin with methanol, drain off excess methanol, treat acid methanol eluate containing streptomycin or streptothricin with the methanol-washed resin by slurrying for a sufficient time to effect the desired reduction in acidity, decant the methanol solution, concentrate the methanol solution by evaporation in vacuo, and precipitate the desired streptomycin or streptothricin by the addition of acetone. If the resin has been previously exhausted it is reactivated in the usual way by stirring with dilute aqueous sodium carbonate and washing with water before being dewatered as described.

The invention is also applicable to the deacidifying of acid solutions of other water-sensitive solutes such as zein (a protein fraction isolated from corn and commercially available) in acid methanol solution. It is also applicable to solutions of other water-sensitive solutes in water-miscible solvents other than methanol, such as ethanol, propanols, butanols, acetone, dioxane and the like in which the solubility of water is greater than the water tolerance of the solute.

The invention is applicable to various ion-exchange materials which require the presence of a minimum amount of water for effective functioning. Examples of such materials are: Amberlite IR-4 (Resinous Products and Chemicals Co.), De-Acidite (the Permutit Co.), Ionac-A (American Cyanamid and Chemical Corp.).

As noted above, when streptomycin or streptothricin is precipitated from a neutral aqueous methanol solutions by addition of another organic liquid such as acetone, the precipitate is gummy and consequently difficult to wash free of mother liquor, difficult to dry and difficult to treat further when additional purification is required. In the practice of our invention, however, as described above, we obtain streptomycin and streptothricin in the form of a fluffy mass of discrete particles which is easy to wash free of mother liquor and easy to dry to a powder and which is substantially free of inorganic salts.

The physical form of other water-sensitive solutes when precipitated, such for example as zein, is likewise improved by following our procedure.

The application of our present invention to acid methanol eluates obtained as described above is illustrated in the following examples, but they are to be taken as illustrative only and not as limiting the scope of our invention, which is defined in the appended claims.

In the examples we use the term "substantially water-free" methanol. By this we mean methanol (or other solvent) containing less water or no more than is tolerated by the water-sensitive solute. In the case of streptomycin, for example, we have found that a water content of more than 4% in the deacidified methanol eluate results in a gummy precipitate when acetone is added. The acid methanol used for elution must contain less than this, for example not over 2.5% and preferably less than 1%. A slight increase in water content during the deacidification step will not interfere with the final precipitation, provided the water content of the methanol before vacuum concentration does not exceed 4%; preferably it is kept lower, e. g. not over about 1.5%.

In dewatering the ion-exchange resin for use in deacidifying methanol solutions according to our invention, we have found it convenient to proceed as follows: We first place the resin as received or after reactivating, containing about 50% moisture, on the bed of a vacuum filter and apply suction until most of the readily removable "free" water has been drained off. At this stage the resin contains about 12% water. We then discontinue the suction and slurry the resin with anhydrous methanol, using enough so that the resin is completely suspended when slurrying.

The methanol is then sucked off and the resin stored in closed containers without further drying. For this washing operation we prefer to use methanol containing not more than 0.1% water. Two samples of resin treated in this way and successfully used in our invention were found to contain the following amounts of H₂O (by weight):

Per cent
1.7
1.86

In general, the ion-exchange materials used in our process should contain not more than 2% and not less than 0.75% water.

In this slurrying treatment the resin may inadvertently be too completely dewatered—a condition which becomes apparent through the excessive time required to raise the pH of the treated solution to the desired value. The condition may readily be corrected by adding small regulated amounts of water, e. g. of the order of 1%–2%, to the resin or to the solution being treated. Excessive dewatering appears more likely to occur with the alcohols above methanol in molecular weight, e. g. ethanol and isopropanol, than with methanol.

Example 1

10 liters of eluate were obtained by stirring 900 grams charcoal-streptomycin adsorbate (dry weight) for one hours with substantially water-free 0.1 n solution of HCl in methanol. The charcoal was filtered off, and to the acid filtrate 2 kg. Amberlite IR–4, which previously had been washed in methanol, as described above, was added and the mixture was stirred vigorously. For pH determination, aliquots were withdrawn at time intervals and decanted from the resin; pH determinations were made after diluting the aliquots with equal volumes of distilled water. The pH before Amberlite treatment is ordinarily about 1.0–2.0 depending on the amount of HCl neutralized by the streptomycin and basic impurities. The pH was found to be:

After 30 min. Amberlite treatment 4.7
After 50 min. Amberlite treatment 5.7
After 120 min. Amberlite treatment 6.05
After 125 min. Amberlite treatment 6.65

The mixture was then strained through cheesecloth to remove the resin, and the filtrate was concentrated in vacuo to about 800 ml. Addition of 15 volumes (12 liters) acetone gave a fluffy non-gummy precipitate of crude streptomycin which dried to a fine powder.

Example 2

The acid filtrate (11 liters) of a streptomycin eluate made with a substantially water-free 0.2 n solution of HCl in methanol was stirred with 2 kg. methanol-washed Amberlite IR–4.

After 60 min. the pH was up to 4.5
After 80 min. the pH was up to 6.03

Concentration and precipitation were effected as in Example 1, with similar results.

Example 3

The acid filtrate (250 ml.) of a streptothricin eluate made with an 0.2 n solution of HCl in methanol was stirred with 100 grams of methanol-washed Amberlite IR–4.

After 23 min. the pH was up to 6.6
After 43 min. the pH was up to 6.8
After 60 min. the pH was up to 6.95

The deacidified eluate was filtered and concentrated, and crude streptothricin was precipitated as described for streptomycin in Example 1. The precipitate was fluffy and non-gummy, and dried to a fine powder.

Example 4

The acid filtrate (550 ml.) of a streptomycin eluate made with a substantially water-free 0.7 n solution of formic acid in MeOH was stirred with 200 grams methanol-washed Amberlite IR–4.

The pH of the acid eluate (an aliquot diluted 1:1 with H₂O) before Amberlite treatment was 2.5.

After 7 hours' stirring, the pH had risen to 5.4; addition of another 100 grams Amberlite IR–4 and further stirring for one hour brought the pH up to 7.0.

Further treatment and results were similar to those described in Example 1.

Example 5

The acid filtrate (18.3 liters) of a streptomycin eluate made with a substantially water-free 0.1 n solution of sulfuric acid in MeOH was stirred with 5400 grams methanol-washed Amberlite IR–4.

After 30 min. the pH was up to 3.2
After 45 min. the pH was up to 3.45
After 63 min. the pH was up to 4.10
After 80 min. the pH was up to 4.58
After 105 min. the pH was up to 5.42
After 113 min. the pH was up to 5.80
After 117 min. the pH was up to 6.09

Further treatment and results were similar to those described in Example 1.

The precipitates obtained in the above described Examples 1–5 are streptomycin and streptothricin products in relatively crude form. Such products usually have a potency in the neighborhood of 150 u./mg. but may range considerably higher and lower (e. g. 90 or 100 u./mg. to 200 u./mg. or more) depending on many variables, especially the potency of the broth from which the adsorbates are prepared. The crude products obtained by our invention are in especially favorable condition for further purification by known methods, or more advantageously by one of the methods disclosed in the copending patent applications of Alburn and Snyder Serial No. 640,140, filed January 9, 1946, for "Recovery and Purification of Antibiotics," now Patent 2,505,318, and Serial No. 643,747, filed January 26, 1946, for "Streptomycin Phosphate," now Patent 2,531,869.

Example 6

A saturated solution of streptomycin in 0.1 n HCl-ethanol was prepared containing approximately 716 mg. in 1500 ml. of solvent. A 500 ml. aliquot of this solution (activity, 75 u./ml.) was stirred with 100 g. methanol- and ethanol-washed Amberlite IR–4. The starting pH of the mixture was 0.64. After 1:15 hours the pH was 0.71. An additional quantity of resin (100 g.) was put into the mixture and further stirring for 2:30 hours brought the pH up to 1.50. 5 ml. of distilled H₂O (1%, solution basis) was added and the stirring continued. After 3:00 hours the pH was up to 2.10.

The mixture was then refrigerated for 64 hours, after which the stirring was continued.

After 2:30 hours the pH was up to 5.55
After 4:30 hours the pH was up to 6.00

Concentration of the resin-free liquid and precipitation with 10 volumes acetone were then effected. The quantity of dry material recovered was 165.5 mg. (185 u:/mg.) representing a total activity of 30,620 units, or 81.9% of the total starting activity (37,500 units).

*Example 7*

Approximately 82 mg. streptomycin (assay, 140 u./mg.) was dissolved in 500 ml. of 0.1 n HCl-isopropanol, and this solution was stirred with 200 g. of fresh isopropanol-washed Amberlite IR-4. After 4:30 hours the pH was 1.36. The mixture was refrigerated for 16 hours.

Continuous agitation for 8 hours more brought the pH to 2.08. Another 100 g. of Amberlite was added and the material refrigerated for 16 hours.

The pH was then up to 4.80, and further stirring for 6 hours brought the final pH to 5.9.

The clear filtrate from this mixture was then processed as usual. The yield of dry material was 121.4 mg. (assay, 42 u./mg.) representing a total activity of 5,090 units or 44.2% of the starting total of 11,500 units.

*Example 8*

A 150 ml. aliquot of the streptomycin solution in 0.1 n HCl-isopropanol, prepared as described in Example 7, was stirred with 60 g. of methanol- and isopropanol-washed De-Acidite. The starting pH was 0.73 and after 2 hours the pH was 0.88.

After 16 hours' refrigeration the pH was 1.44 and further agitation for 5 hours resulted in little change (pH 1.51). 2% water was therefore added and after two hours the pH was 1.95. The material was again refrigerated for 16 hours.

Stirring for 4:30 hours more decreased the acidity from pH 1.96 to 2.90. Another 60 g. of resin was added and after further 3:30 hours, the pH was 6.16. The mixture was then processed for recovery of dry streptomycin.

A yield of 31.8 mg. of residue was obtained with an activity of 42 u./mg., representing a 29.7% yield.

*Example 9*

Zein was dissolved in 0.1 n HCl-methanol to form a 3.33% solution having an initial pH of 0.2. This solution was stirred with Amberlite IR-4 (100 g.:200 ml.) previously partially dewatered by slurrying with methanol as described above; after 3 hours' stirring the pH had risen to 6.2. The mixture was strained to remove the Amberlite and an aliquot of the filtrate was treated with 5 volumes of ether. This produced a fluffy non-gummy precipitate of zein which on drying in vacuo amounted to a 75.9% yield calculated back to the starting material.

*Example 10*

Two samples of 0.1 n HCl-methanol containing no solute were deacidified respectively by (*a*) Ionac and (*b*) De-Acidite, the resins having previously been partially dewatered by slurrying with methanol as described above. In each case 500 ml. of solution having a pH less than 1 was treated as indicated with results shown below:

|  | (a) Ionac | (b) De-Acidite |
|---|---|---|
| Original amount of resin_____g__ | 50 | 50 |
| After stirring_____minutes__ | 135 | 120 |
| pH was_____ | 2.3 | 2.5 |
| Additional resin_____g__ | 50 | 50 |
| After further stirring for_____minutes__ | 90 | 65 |
| pH was_____ | 7.0 | 6.2 |

While we do not wish to be limited to any particular theory as to the mechanism of our invention, we offer the following as a possible explanation in the case where the anion-exchange resin has amino groups and may be represented by the symbol $R \cdot NH_2$:

1. If the resin is wet, as when received, it effectively removes acid from the methanol eluate, but the water introduced into the eluate interferes with the subsequent precipitation. In this, for our purpose inoperative, case, a true ion exchange occurs:

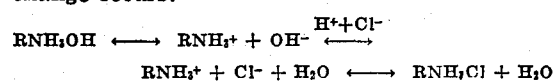

2. If the resin is completely air dried, either from its wet condition or after methanol washing, removal of acid from the eluate does not take place, or does so at so slow a rate as to be useless for our purpose. Where acid is removed it is apparently by direct addition and not by ion exchange:

3. When the resin is treated according to our invention so as to leave only a minimum amount of water in it, it is believed that this amount is sufficient to ionize the HCl in contact with the resin and cause the ion-exchange reaction shown in case 1, but is so limited that the water present at no time substantially exceeds what can remain adsorbed to the resin surface.

While we have described our invention in terms of batch operations, it may also be operated continuously or semicontinuously; for example, the anion-exchange material may be brought into contact with the various solutions described by circulating or percolating the solutions through layers of the exchange material in towers or beds. The layers may be single layers or multiple layers operated in series or parallel. Substantially the same limitations hold as respects water content of the deacidified solutions in continuous as in batch operations. The water content of the exchange material in continuous operation may, however, vary somewhat from inlet to outlet layer of the bed or from inlet to outlet column in a series of columns.

The choice between batch and continuous operation will be largely determined by economic considerations involving the capacity of the equipment, continuity of operation and the like.

In the specification and claims, the word "ion" and its derivatives are intended to include both actual and potentially present ions—for example, the chloride ion that is potentially present in an anhydrous ethanol solution of HCl.

We claim:

1. In a process of recovering a chemically basic bacteriostat of the class which consists of streptomycin and streptothricin from a substantially water-free dilute acid solution of the bacteriostat in a lower alcohol, the steps which comprise: mechanically removing the major part of the free water from a wet solid granular anion-exchange resin, slurrying the thus partially dewatered resin with a substantially water-free monohydric saturated aliphatic alcohol containing not more than three carbon atoms in amount sufficient to completely suspend the resin and then mechanically removing excess alcohol from the resin, whereby the water retained by the resin is in the range 0.75 to 2 percent of the weight of the resin, bringing the thus treated granular resin while still wet with alcohol into contact with the acid alcoholic solution of the bacteriostat, maintaining contact of resin and solution until a sample of the latter diluted with an equal volume of water shows a pH of at least 6, separating resin and solution, concentrating the solution to small volume by low-temperature evaporation, precipitating the bacteriostat by addition of a volatile liquid organic precipitant, and separating the precipitated bacteriostat in the form of a non-gummy mass of fine discrete particles.

2. The process of claim 1 in which the bacteriostat is streptomycin.

3. The process of claim 1 in which the bacteriostat is streptothricin.

4. The process of claim 1 in which the alcohol is methanol.

5. The process of claim 1 in which the alcohol is ethanol.

6. The process of claim 1 in which the precipitant is acetone.

7. The method of treating a wet granular resinous anion-exchange material to prepare it for use in the deacidification of a substantially water-free acid solution of a water-sensitive solute in a water-miscible solvent which comprises: mechanically freeing the material of the major part of its free water content, slurrying the thus partially dewatered material with a substantially water-free monohydric saturated aliphatic alcohol containing not more than three carbon atoms in amount sufficient to completely suspend the material, and then separating the material from the bulk of the alcohol, whereby the water retained by the material is in the range 0.75–2 percent of the weight of the material.

ERIC G. SNYDER.
JOSEPH W. OPIE.

REFERENCES CITED

The following references are of record in the file of this patent:

UNITED STATES PATENTS

| Number | Name | Date |
|---|---|---|
| 2,151,883 | Adams et al. | Mar. 28, 1939 |
| 2,229,870 | Pearce | Jan. 28, 1941 |
| 2,251,234 | Swain | July 29, 1941 |
| 2,366,651 | Rawlings | Jan. 2, 1945 |
| 2,378,449 | Tishler | June 19, 1945 |
| 2,382,334 | Riley et al. | Aug. 14, 1945 |
| 2,402,384 | Eastes | June 18, 1946 |
| 2,443,485 | Waksman et al. | June 15, 1948 |
| 2,505,318 | Alburn et al. | Apr. 25, 1950 |

OTHER REFERENCES

Myers: Ind. Eng. Chem. Aug., 1943, page 863, 1 page.

Waksman: J. Amer. Pharm. Assoc., vol. 34 (1945), pages 276–7, 2 pages, Scientific Edition.

Carter et al.: J. Biol. Chem., vol. 160 (1945), pages 337–8, 2 pages.

Le Page et al.: J. Biol. Chem., vol. 162 (1946), pages 165–6, 2 pages.